(12) United States Patent
Hirano et al.

(10) Patent No.: US 10,766,558 B2
(45) Date of Patent: Sep. 8, 2020

(54) FUEL TANK AND SADDLE RIDING VEHICLE

(71) Applicant: HONDA MOTOR CO., LTD., Tokyo (JP)

(72) Inventors: Kohei Hirano, Wako (JP); Kota Murasawa, Wako (JP); Ryuji Masuda, Wako (JP); Motoaki Takashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 16/142,828

(22) Filed: Sep. 26, 2018

(65) Prior Publication Data

US 2019/0100270 A1   Apr. 4, 2019

(30) Foreign Application Priority Data

Sep. 29, 2017   (JP) .................................. 2017-190711

(51) Int. Cl.
| | |
|---|---|
| *B62J 35/00* | (2006.01) |
| *B60K 15/073* | (2006.01) |
| *B60K 15/03* | (2006.01) |

(52) U.S. Cl.
CPC ............ *B62J 35/00* (2013.01); *B60K 15/073* (2013.01); *B60K 2015/03032* (2013.01);
(Continued)

(58) Field of Classification Search
CPC ............................... B62J 35/00; B60K 15/073
See application file for complete search history.

(56) References Cited

U.S. PATENT DOCUMENTS

| | | | | |
|---|---|---|---|---|
| 3,931,907 A | * | 1/1976 | Henle | .................... B65D 88/62 |
| | | | | 220/530 |
| 4,964,483 A | | 10/1990 | Yokoyama et al. | |

(Continued)

FOREIGN PATENT DOCUMENTS

| | | |
|---|---|---|
| CN | 104175871 A | 12/2014 |
| EP | 1514629 A1 | 3/2005 |

(Continued)

OTHER PUBLICATIONS

Extended European Search Report dated Feb. 25, 2019 for Application No. 18197093.0.

(Continued)

*Primary Examiner* — Kevin Hurley
(74) *Attorney, Agent, or Firm* — Birch, Stewart, Kolasch & Birch, LLP

(57) ABSTRACT

In a fuel tank in which an upper joint flange of an upper tank half body and a lower joint flange of a lower tank half body are sandwiched between and seam welded by a pair of roller electrodes, the lower tank half body includes a lower tank main body portion and expansion tank portions shallower than the lower tank main body portion and disposed on opposite sides of the lower tank main body portion. A side wall of at least one of the upper and lower tank half bodies is provided with roller escape recesses recessed inwardly, the roller escape recesses being formed at a position corresponding to a connection portion of a main body corresponding joint portion and expansion tank corresponding joint portions in a joint portion formed by seam welding, and avoiding a contact with at least one of the pair of roller electrodes.

7 Claims, 12 Drawing Sheets

(52) U.S. Cl.
CPC ............... *B60K 2015/03059* (2013.01); *B60K 2015/03171* (2013.01); *B60Y 2200/12* (2013.01)

(56) References Cited

U.S. PATENT DOCUMENTS

| | | | |
|---|---|---|---|
| 2004/0134892 A1* | 7/2004 | Kido | B23K 26/244 219/121.64 |
| 2007/0089922 A1* | 4/2007 | Iwasaki | B62J 37/00 180/219 |
| 2012/0228857 A1* | 9/2012 | Karube | F02M 37/0076 280/835 |

FOREIGN PATENT DOCUMENTS

| | | |
|---|---|---|
| JP | 60-161283 A | 8/1985 |
| JP | 62-29478 A | 2/1987 |
| JP | 9-315364 A | 12/1997 |
| JP | 10-76985 A | 3/1998 |
| JP | 2004-9132 A | 1/2004 |
| JP | 2012-245939 A | 12/2012 |
| JP | 2015-13295 A | 1/2015 |

OTHER PUBLICATIONS

Japanese Notice of Reasons for Refusal for corresponding Japanese Application No. 2017-190711, dated Feb. 27, 2019, with English translation.

* cited by examiner

FUEL TANK AND SADDLE RIDING VEHICLE

BACKGROUND OF THE INVENTION

Field of the Invention

The present invention relates to a fuel tank comprising: an upper tank half body that is made of metal and press formed so as to have an upper joint flange on an outer periphery of the upper tank half body; and a lower tank half body that is made of metal and press formed so as to have a lower joint flange on an outer periphery of the lower tank half body, the upper joint flange and the lower joint flange being sandwiched between and seam welded by a pair of roller electrodes. The present invention also relates to a saddle riding vehicle on which the fuel tank is mounted.

Description of the Related Art

The fuel tank in which the upper joint flange on the outer periphery of the metal upper tank half body and the lower joint flange on the outer periphery of the metal lower tank half body are seam welded with a pair of roller electrodes between which those joint flanges are sandwiched has already been known by Japanese Patent Application Laid-open No. 2015-13295.

Incidentally, the fuel tank disclosed in Japanese Patent Application Laid-open No. 2015-13295 is of a large-sized type having a shape straddling left and right main frames in a vehicle body frame of a two-wheeled motor vehicle. In the large-sized fuel tank, a large amount of plate material for press forming the upper tank half body and the lower tank half body is used so that a material cost is increased. Therefore, it is conceivable to make the fuel tank a complicated shape so as to avoid an increase in size while increasing a capacity of the entire fuel tank. In that case, in order to secure formability in forming the fuel tank by seam welding the upper joint flange and the lower joint flange, there is a need to prevent the roller electrodes from interfering with the upper tank half body or the lower tank half body.

SUMMARY OF THE INVENTION

The present invention has been made in view of the above circumstances, and a first object of the present invention is to provide a fuel tank that increases a capacity and improves formability while preventing a material cost from being increased by avoiding the use of a large amount of metal plate material for forming. A second object of the present invention is to provide a saddle riding vehicle in which the fuel tank is properly placed.

In order to achieve the first object, according to a first feature of the present invention, there is provided a fuel tank comprising: an upper tank half body that is made of metal and press formed so as to have an upper joint flange on an outer periphery of the upper tank half body; and a lower tank half body that is made of metal and press formed so as to have a lower joint flange on an outer periphery of the lower tank half body, the upper joint flange and the lower joint flange being sandwiched between and seam welded by a pair of roller electrodes, wherein the lower tank half body includes a lower tank main body portion and a pair of expansion tank portions that are shallower than the lower tank main body portion and disposed on opposite sides of the lower tank main body portion, the upper joint flange and the lower joint flange are seam welded together to form a joint portion that includes a main body corresponding joint portion and a pair of expansion tank corresponding joint portions, the main body corresponding joint portion being disposed on an outer periphery of the lower tank main body portion except for an area between the joint portion and the expansion tank portion, the pair of expansion tank corresponding joint portions being connected to the main body corresponding joint portion and disposed on an outer periphery of the pair of expansion tank portions except for an area between the joint portion and the lower tank main body portion, and a side wall of at least one of the upper tank half body and the lower tank half body is provided with a roller escape recess that is recessed inwardly, the roller escape recess being formed at a position corresponding to a connection portion of the main body corresponding joint portion and the expansion tank corresponding joint portions, and avoiding a contact with at least one roller electrode out of the pair of roller electrodes.

With the first feature of the present invention, the lower tank half body is formed with the lower tank main body portion and the pair of expansion tank portions that are disposed on opposite sides of the lower tank main body portion. As a result, the capacity is increased while the shape of the fuel tank is complicated and the fuel tank is prevented from being increased in size so that the cost can be reduced by effectively using the tank plate material for press forming. Moreover, the upper joint flange and the lower joint flange are seam welded together to form the joint portion, and the joint portion includes the main body corresponding joint portion and the pair of expansion tank corresponding joint portions. The main body corresponding joint portion is disposed on the outer periphery of the lower tank main body portion except for the area between the joint portion and the expansion tank portion. The pair of expansion tank corresponding joint portions are disposed on the outer periphery of the expansion tank portions except for the area between the joint portion and the lower tank main body portion, and are connected to the main body corresponding joint portion. At the position corresponding to the connection portion of the main body corresponding joint portion and the expansion tank corresponding joint portions, on the side wall of at least one of the upper tank half body and the lower tank half body, the roller electrodes are prevented from interfering with at least one of the upper tank half body and the lower tank half body at a portion where a traveling direction of the roller electrodes changes, thereby being capable of improving the formability.

According to a second feature of the present invention, in addition to the first feature, the expansion tank corresponding joint portions are formed to bulge laterally while curving downward from the main body corresponding joint portion, and the roller escape recess is formed on the side wall of the upper tank half body, the roller escape recess avoiding interference with a second roller electrode, of the pair of roller electrodes, that abuts against the upper joint flange and is larger in diameter than a first roller electrode, of the pair of roller electrodes, abutting against the lower joint flange.

With the second feature of the present invention, the expansion tank corresponding joint portions are formed to bulge laterally while curving downward from the main body corresponding joint portion. Therefore the second roller electrode, of the pair of roller electrodes, which is larger in diameter than the first roller electrode, of the pair of roller electrodes, abutting against the lower joint flange is prevented from coming in contact with the side wall of the upper tank half body as much as possible. As a result, the roller escape recess provided in the side wall of the upper tank half body is reduced as much as possible, and an influence of the roller escape recess on the capacity of the fuel tank can be reduced.

According to a third feature of the present invention, in addition to the second feature, an angle, as seen in a side view, of the connection portion of the expansion tank corresponding joint portions to the main body corresponding joint portion in a portion corresponding to the roller escape recess is set to 20 degrees or more.

With the third feature of the present invention, the angle, as seen in a side view, of the connection portion of the expansion tank corresponding joint portions to the main body corresponding joint portion in the portion corresponding to the roller escape recess is set to 20 degrees or more. As a result, the contact of the second roller electrode with the side wall of the upper tank half body can be more easily avoided, the roller escape recess can be reduced in size, and the tank capacity can be more easily ensured.

In order to achieve the second object, according to a fourth feature of the present invention, there is provided a saddle riding vehicle on which the fuel tank according to any one of the first feature to the third feature is mounted, comprising: a fuel tank having the pair of expansion tank portions disposed on opposite sides of a front portion of the lower tank main body portion in a vehicle longitudinal direction; a vehicle body frame on which the fuel tank is mounted; and a riding seat disposed behind the expansion tank portions in the vehicle longitudinal direction.

With the fourth feature of the present invention, the pair of expansion tank portions are disposed on opposite sides of the front portion of the lower tank main body portion in the vehicle longitudinal direction, and the riding seat is disposed behind the expansion tank portions in the vehicle longitudinal direction. As a result, the occupant riding on the riding seat can grip a narrower portion of the fuel tank at the rear of the expansion tank portions with occupant's knees, thereby being capable of obtaining an excellent riding posture.

According to a fifth feature of the present invention, in addition to the fourth feature, the vehicle body frame includes a pair of left and right main frames that are separated to left and right from a head pipe steerably supporting a steering handlebar and extend rearward, and the fuel tank is supported by the vehicle body flame so as to dispose the expansion tank portions outside the main frames.

With the fifth feature of the present invention, since the pair of expansion tank portions of the fuel tank are disposed outside the pair of left and right main frames, the capacity of the fuel tank can be increased by effectively leveraging the spaces outside the main frames. In particular, when the expansion tank corresponding joint portions are formed to protrude laterally while curving downward from the main body corresponding joint portion, a compact arrangement in the vehicle width direction can be performed.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described with reference to the accompanying drawings. In the following description, up, down, right, left, front and rear directions refer to directions seen from an occupant riding a two-wheeled motor vehicle.

Figure 1:
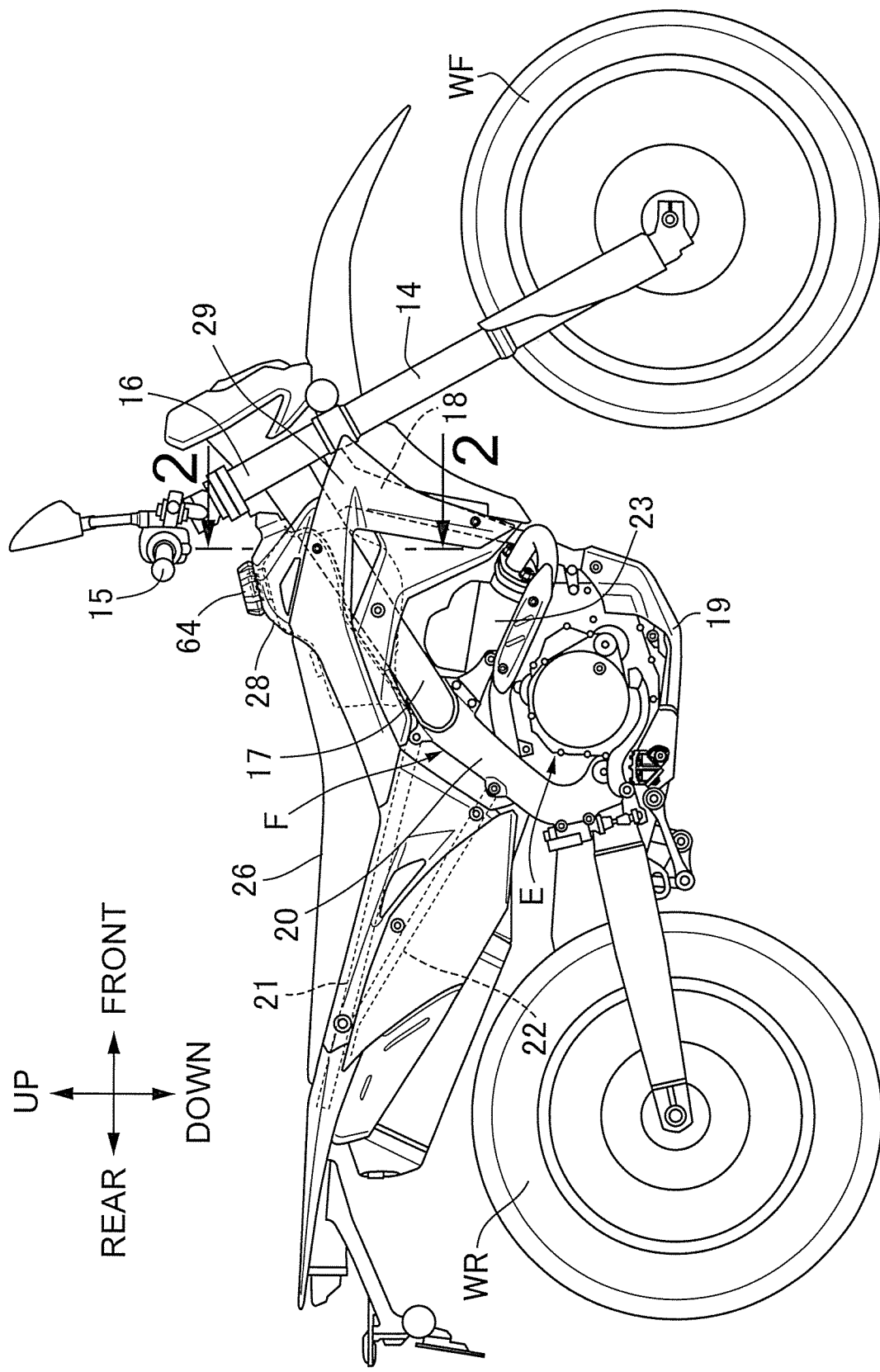
FIG. 1 is a right side view of a two-wheeled motor vehicle.

First, referring to FIG. 1, a body frame F of a two-wheeled motor vehicle, which is a saddle riding vehicle, includes a head pipe 16, a pair of left and right main frames 17, a down frame 18, a pair of left and right lower frames 19, a pair of left and right pivot frames 20, a pair of left and right seat rails 21, and a pair of left and right rear frames 22. The head pipe 16 steerably supports a front fork 14 that pivotally supports a front wheel WF and a bar-shaped steering handlebar 15. The pair of left and right main frames 17 extend downward toward the rear from the head pipe 16. The down frame 18 extends downward toward the rear from the head pipe 16 at a steeper angle than that of the main frames 17. The pair of left and right lower frames 19 are connected to a lower end part of the down frame 18 and extends rearward. The pair of left and right pivot frames 20 connect between rear end parts of the main frames 17 and a rear end part of the lower frame 19 and extends in an up-down direction. The pair of left and right seat rails 21 extend rearward from upper end parts of the pivot frames 20. The pair of left and right rear frames 22 connect between intermediate portions in an up-down direction of the pair of left and right pivot frames 20 and intermediate portions in a front-rear direction of the paired seat rails 21.

An engine body 23 of an air-cooled engine E is disposed in a space surrounded by the main frames 17, the down frame 18 the lower frames 19, and the pivot frames 20. The engine E exerts a power for driving a rear wheel WR. The engine body 23 is supported by a lower portion of the down frame 18, upper portions of the pivot frames 20, and the lower frames 19.

Figure 2:
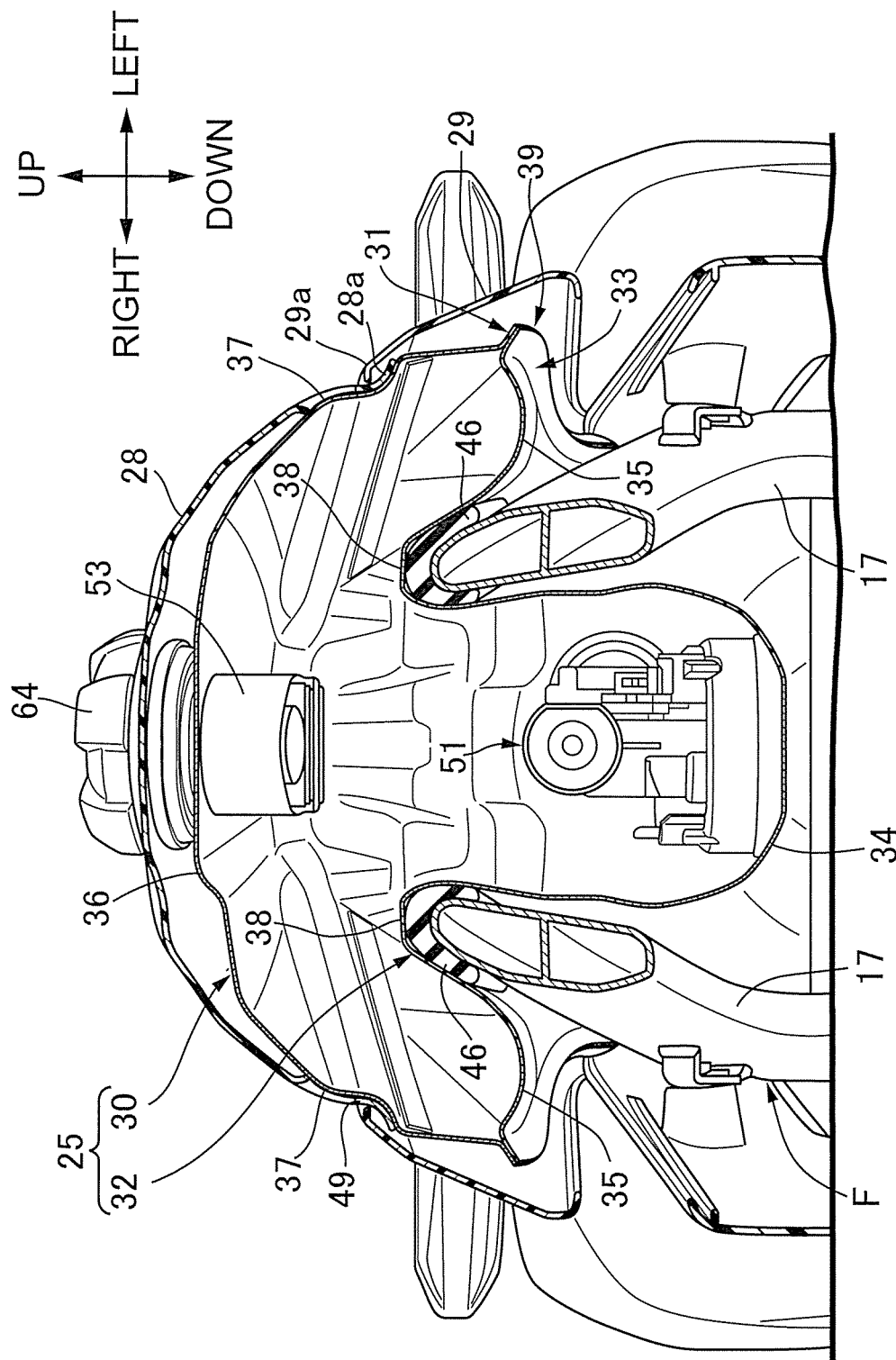
FIG. 2 is an enlarged sectional view taken along a line 2-2 of FIG. 1.
Figure 3:
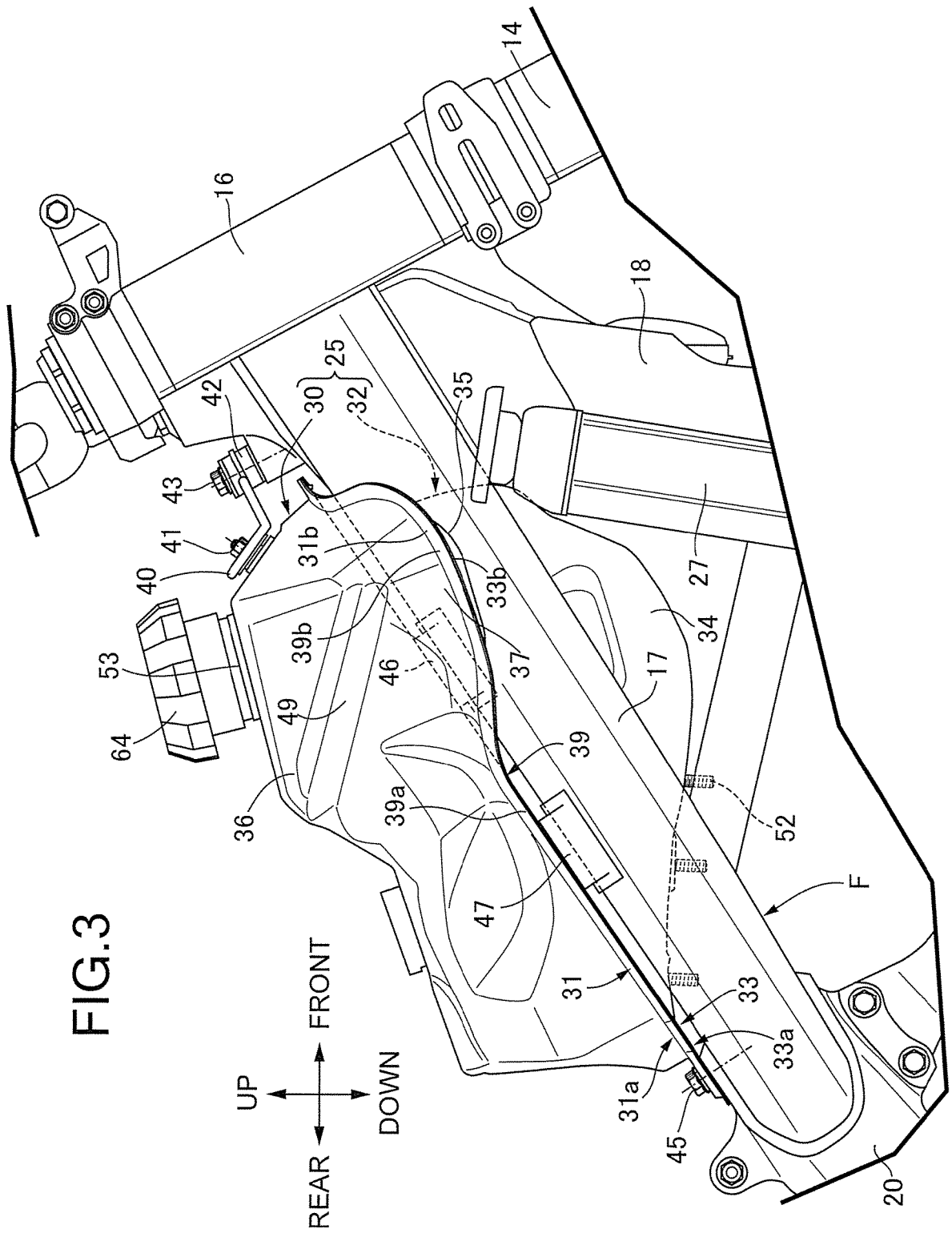
FIG. 3 is an enlarged right side view of a vehicle body frame and a fuel tank in a state in which a side cover, a tank cover, and a riding seat are omitted.

Referring to FIGS. 2 and 3, a fuel tank 25 is disposed above the engine E, and a riding seat 26 is located so as to cover a rear half portion of the fuel tank 25 with a front portion of the riding seat 26. The riding seat 26 is supported by the seat rails 21. A radiator 27 (refer to FIG. 3) is disposed below the fuel tank 25 and in front of the engine body 23.

Opposite sides of the fuel tank 25 in a width direction are formed so as to straddle the pair of left and right main frames 17 from above, and the fuel tank 25 is supported by the vehicle body frame F. An upper portion of the fuel tank 25 is covered with a tank cover 28 from above, and upper portions of opposite sides of the fuel tank 25 and a part of the main frames 17 are covered with a shroud 29.

Referring to FIGS. 4 to 7, the fuel tank 25 includes an upper tank half body 30 and a lower tank half body 32. The upper tank half body 30 has an upper joint flange 31 on an outer periphery of the upper tank half body 30. The lower tank half body 32 has a lower joint flange 33, which is to be joined to the upper joint flange 31, on an outer periphery of the lower tank half body 32. The upper tank half body 30 and the lower tank half body 32 are made of metal, for example, pure titanium.

The lower tank half body 32 is formed with a lower tank main body portion 34 and a pair of expansion tank portions 35. The pair of expansion tank portions 35 are arranged on opposite sides of the lower tank main body portion 34. The upper tank half body 30 is formed with an upper tank main body portion 36 and a pair of protrusion portions 37. The pair of protrusion portions 37 laterally protrude from the upper tank main body portion 36 so as to cover the respective expansion tank portions 35.

Parts of the lower joint flange 33 and the upper joint flange 31 are formed in a flat shape as a lower planar flange portion 33a and an upper planar flange portion 31a, respectively. The lower tank main body portion 34 is elongated in a direction parallel to a reference plane BP including joint surfaces of the lower planar flange portion 33a and the upper planar flange portion 31a. One side (a front side along the longitudinal direction of the vehicle in the present embodiment) of the lower tank main body portion 34 along a longitudinal direction of the lower tank main body portion 34 is provided with a narrow portion 34a narrower than the other side (a rear side along the longitudinal direction of the vehicle in the present embodiment). The narrow portion 34a is formed to bulge toward a lower side of the reference plane BP. The expansion tank portions 35 are disposed on opposite sides of the narrow portion 34a as seen in a plan view from a direction orthogonal to the reference plane BP. The expansion tank portions 35 are formed to be shallower than the lower tank main body portion 34 so as to bulge downward from the reference plane BP. In a state where the fuel tank 25 is mounted on the vehicle body frame F, the reference plane BP is a plane which is inclined upward toward the front as seen in a side view.

Figure 5:
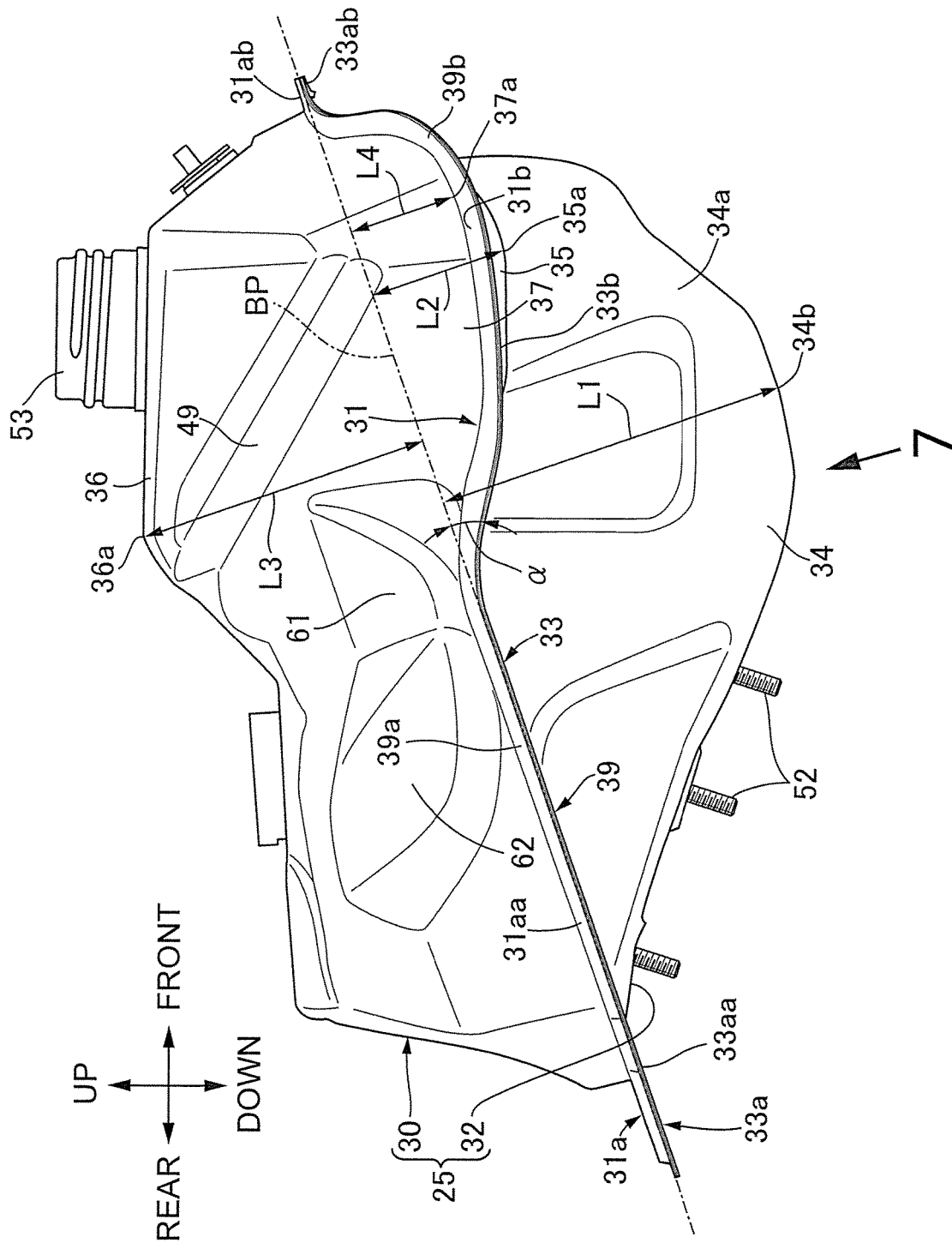
FIG. 5 is a right side view of the fuel tank.
Figure 6:
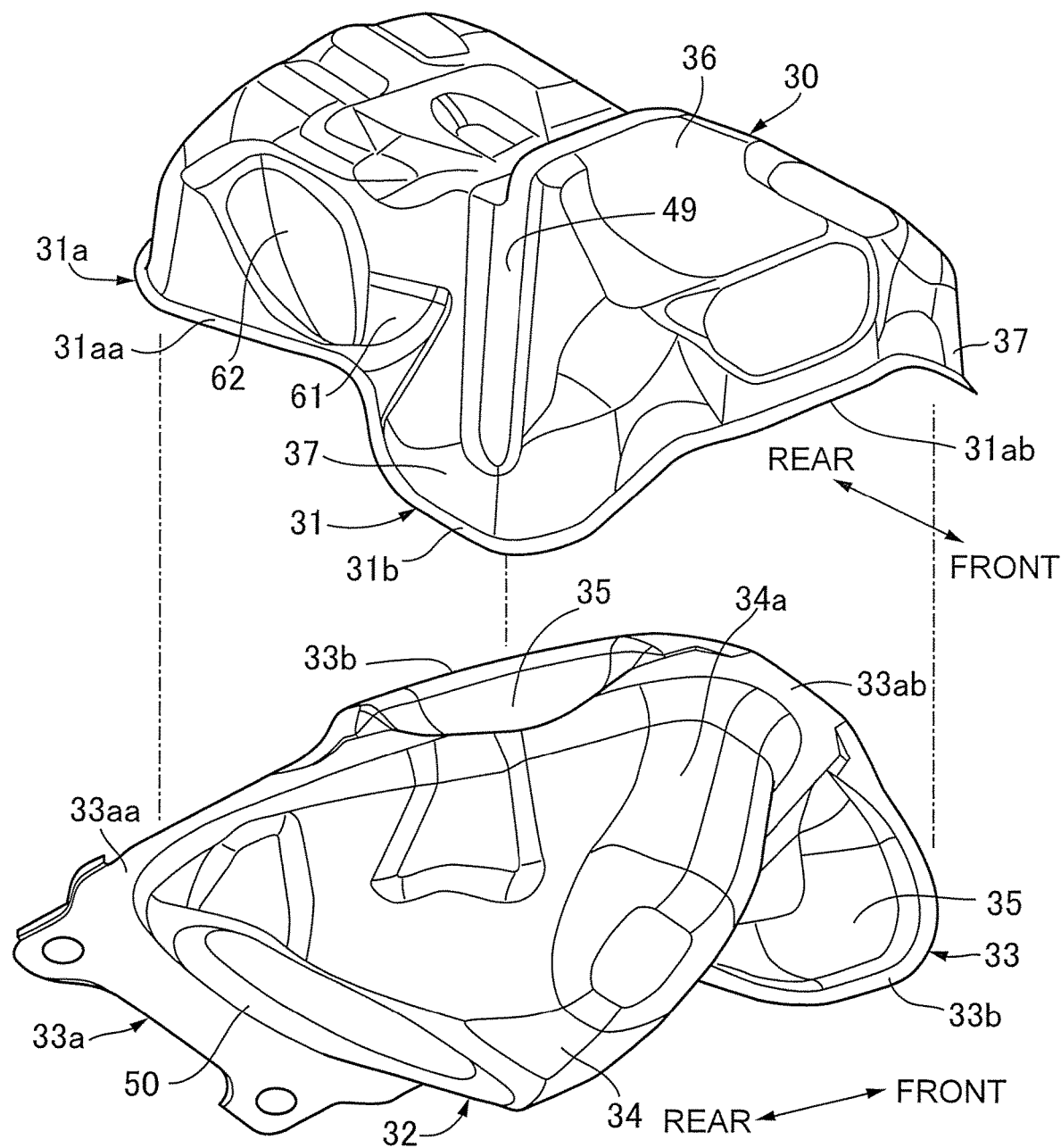
FIG. 6 is an exploded perspective view of the fuel tank.
Figure 7:
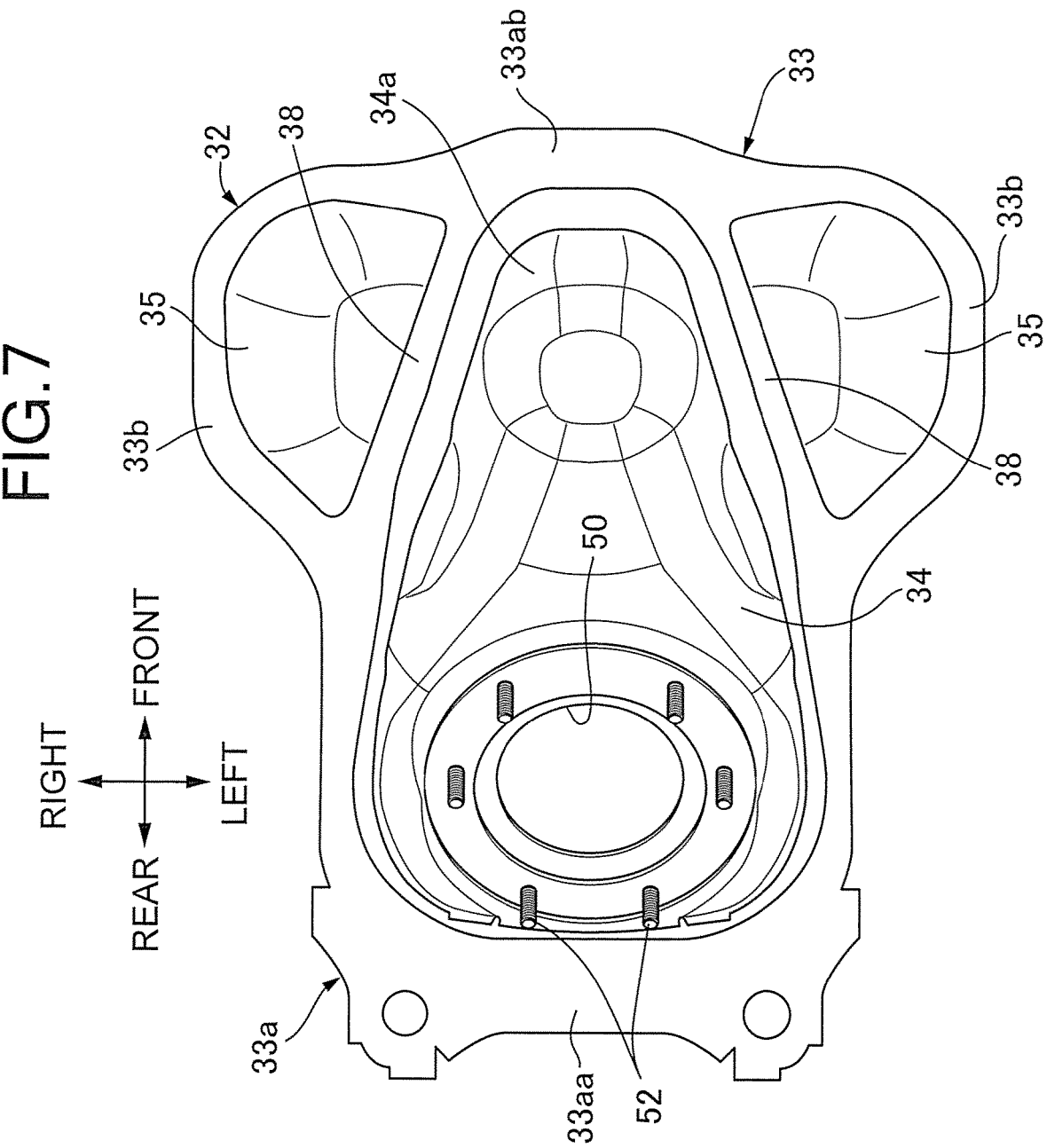
FIG. 7 is a view as seen in a direction of an arrow 7 in FIG. 5.

With particular attention to FIG. 5, a lower tank main body deepest portion 34b of the lower tank main body portion 34 and expansion tank deepest portions 35a of the expansion tank portions 35 are disposed at positions offset from each other in the longitudinal direction of the lower tank main body portion 34. The lower tank main body deepest portion 34b is largest in distance L1 from the reference plane BP in the lower tank main body portion 34. The expansion tank deepest portions 35a are largest in distance L2 from the reference plate BP in the expansion tank portions 35.

The upper tank main body portion 36 is formed so as to bulge above the reference plane BP. The protrusion portions 37 protrude laterally from the upper tank main body portion 36 so as to cover the respective expansion tank portions 35, and the protrusion portions 37 are formed to be disposed underneath the reference plane BP.

An upper tank main body highest portion 36a of the upper tank main body portion 36 and protrusion lowest portions 37a of the protrusion portions 37 are disposed at positions offset from each other in the longitudinal direction of the lower tank main body portion 34. The upper tank main body highest portion 36a is largest in distance L3 from the reference plane BP, and the protrusion lowest portions 37a are largest in distance L4 from the reference plane BR The lower planar flange portion 33a and the upper planar flange portion 31a include first lower and upper planar portions 33aa, 31aa and second lower and upper planar portions 33a b, 3 lab, respectively. The first lower and upper planar portions 33aa and 31aa are disposed on the other side along the longitudinal direction (the rear side along the vehicle longitudinal direction in the present embodiment) and disposed at peripheries of the lower tank half body 32 and the upper tank half body 30, respectively. The second lower and upper planar portions 33ab and 31ab are disposed on an end part on the one side (the front side along the vehicle longitudinal direction in the present embodiment) along the longitudinal direction at peripheries of the lower tank half body 32 and the upper tank half body 30, respectively. Lower and upper expansion flange portions 33b and 31b are formed to connect the first lower and upper planar portions 33aa, 31aa and the second lower and upper planar portions 33ab, 31ab. The lower and upper expansion flange portions 33b and 31b are remaining portions of the lower joint flange 33 and the upper joint flange 31 except for the lower planar flange portion 33a and the upper planar flange portion 31a. Moreover, the lower and upper expansion flange portions 33b and 31b are inclined downward toward outside from the lower planar flange portion 33a and the upper planar flange portion 31a.

Flat plate portions 38 are flush with the lower planar flange portion 33a and formed in the lower tank half body 32 so as to be interposed between the narrow portion 34a of the lower tank main body portion 34 and the expansion tank portions 35.

A joint portion 39 is formed by seam-welding the upper joint flange 31 and the lower joint flange 33. The joint portion 39 includes a main body corresponding joint portion 39a and a pair of expansion tank corresponding joint portions 39b. The main body corresponding joint portion 39a is disposed in a portion of an outer periphery of the lower tank main body portion 34 except for an area between the joint portion 39 and the expansion tank portions 35. The pair of expansion tank corresponding joint portions 39b are disposed in a portion of an outer periphery of the pair of expansion tank portions 35 except for an area between the joint portion 39 and the lower tank main body portion 34, and connected to the main body corresponding joint portion 39a. The expansion tank corresponding joint portions 39b are formed so as to bulge laterally while curving downward from the main body corresponding joint portion 39a.

The fuel tank 25 is supported by the vehicle body frame F above the engine E. The lower tank main body portion 34 is disposed between the pair of main frames 17 of the vehicle body frame F and the expansion tank portions 35 are disposed outside the main frames 17.

Figure 4:
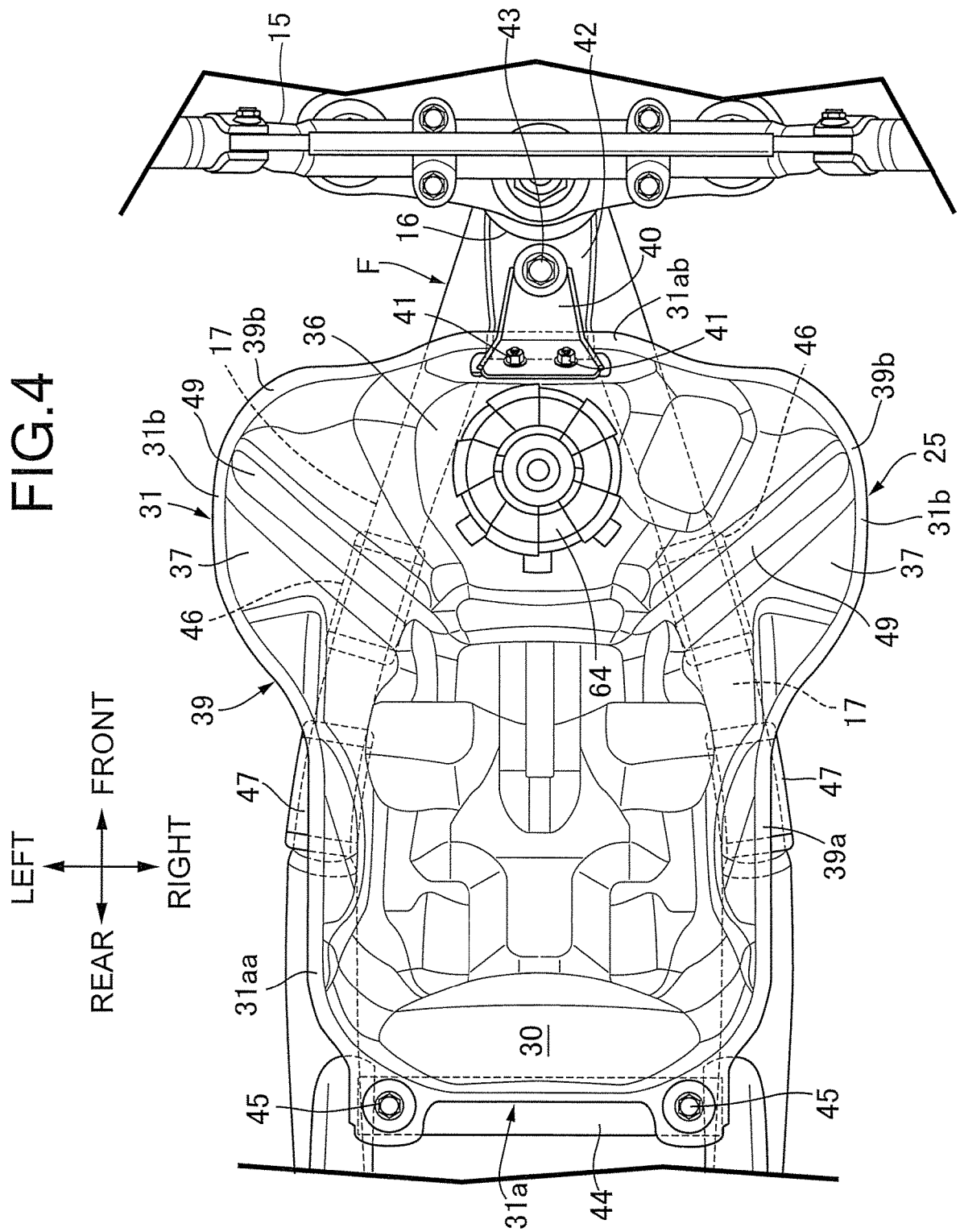
FIG. 4 is a view as seen in a direction of an arrow 4 in FIG. 3.

With particular attention to FIGS. 3 and 4, a support stay 40 is fastened to a front end portion of the upper tank half body 30 of the fuel tank 25 in the vehicle longitudinal direction with a pair of first bolts 41. The support stay 40 extends forward from the upper tank half body 30 in the vehicle longitudinal direction. A front end portion of the support stay 40 is fastened to a support boss 42 connected to the head pipe 16 with a second bolt 43. In other words, the front end portion of the fuel tank 25 is supported by the head pipe 16. On the other hand, opposite sides of a rear end portion of the main body corresponding joint portion 39a of the joint portion 39 in the vehicle longitudinal direction are fastened to a cross member 44 with a pair of third bolts 45. The cross member 44 is disposed between the pair of left and right main frames 17 and configures a part of the vehicle body frame F. In other words, a rear end portion of the fuel tank 25 is supported by the cross member 44.

With particular attention to FIG. 2, elastic members 46 such as rubber are interposed between the flat plate portions 38 of the lower tank half body 32 in the fuel tank 25 supported by the vehicle body frame F and the main frames 17. Elastic members 47 such as rubber are interposed between the first lower planar portion 33aa of the lower planar flange portion 33a in the lower tank half body 32 and the main frames 17.

Incidentally, a lower end portion 28a of the tank cover 28 and an upper end portion 29a of the shroud 29 are disposed to overlap with each other so that the lower end portion 28a of the tank cover 28 is covered with the upper end portion 29a of the shroud 29. The lower end portion 28a is a portion that covers the fuel tank 25 from the side in a lower portion of the tank cover 28. The upper end portion 29a is a portion that covers the fuel tank 25 from the side in an upper portion of the shroud 29. An accommodation groove 49 is provided in a side wall of the upper tank main body portion 36 in the fuel tank 25. The accommodation groove 49 extends upward toward the rear so as to accommodate an overlapping portion 48 of the lower end portion 28a and the upper end portion 29a.

A filler opening 50 is provided at a bottom portion of the lower tank main body portion 34 in the fuel tank 25. The filler opening 50 is provided for supplying a fuel from the fuel tank 25 to the engine E side. A pump unit 51 is fastened to the lower tank main body portion 34 with multiple fourth bolts 52. The pump unit 51 is inserted into the fuel tank 25 from the filler opening 50 and the multiple fourth bolts 52 are disposed on a periphery of the filler opening 50. In addition a fueling pipeline 53 is fixed to a ceiling portion of the upper tank main body portion 36 in the fuel tank 25 so as to penetrate through the tank cover 28. The fueling pipeline 53 is provided for supplying the fuel into the fuel tank 25. A fuel filler cap 64 is attached to an upper end portion of the fueling pipeline 53 in an openable and closable manner.

In addition, the riding seat 26 covers a rear half portion of the fuel tank 25 with a front portion of the riding seat 26. The riding seat 26 is positioned to be disposed on the rear side of the expansion tank portions 35 in the fuel tank 25 in the vehicle longitudinal direction.

Figure 9:
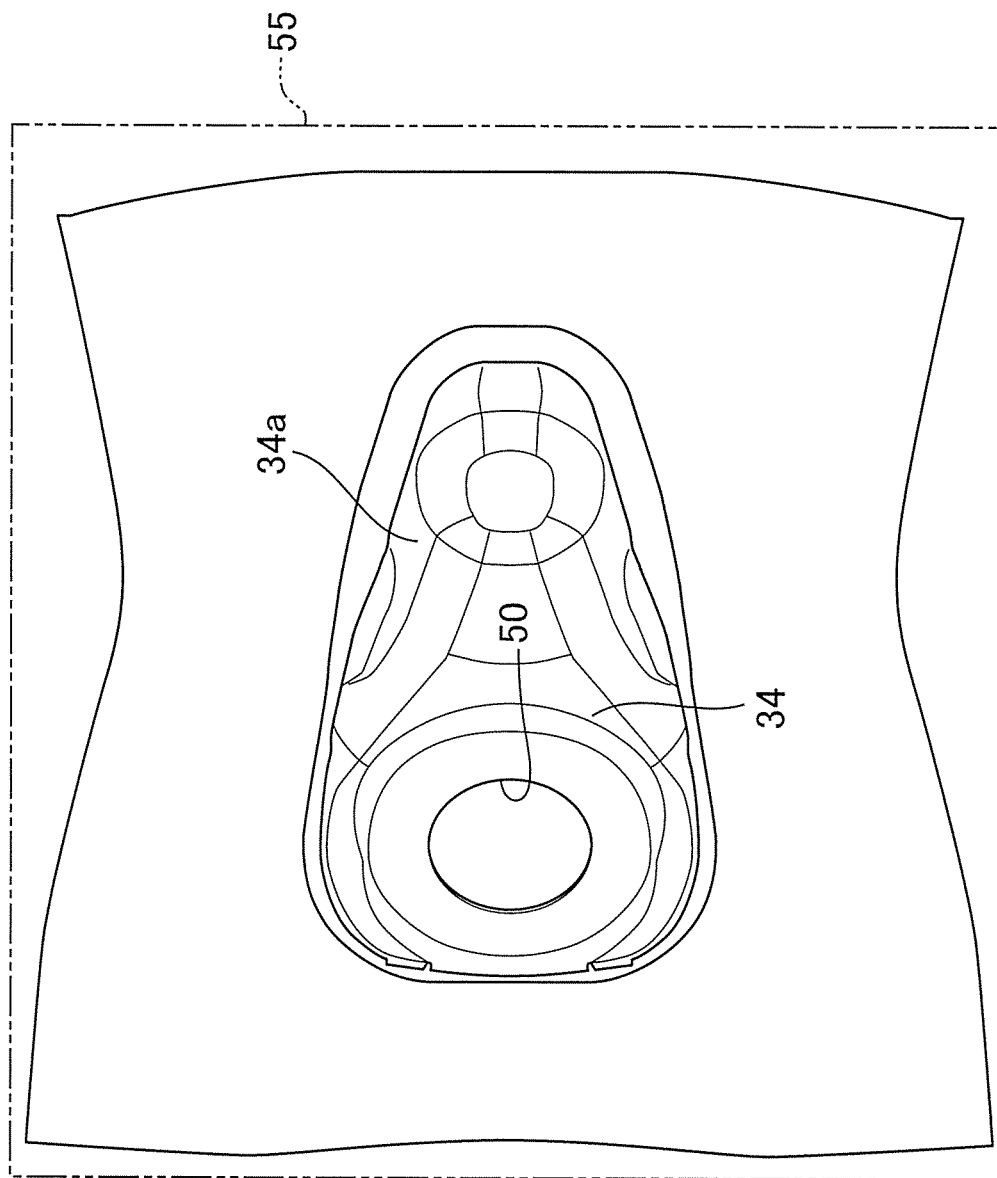
FIG. 9 is a plan view showing a state in which a lower tank main body portion and a lower planar flange portion are formed by drawing in a press-forming process of the lower tank half body.
Figure 10:
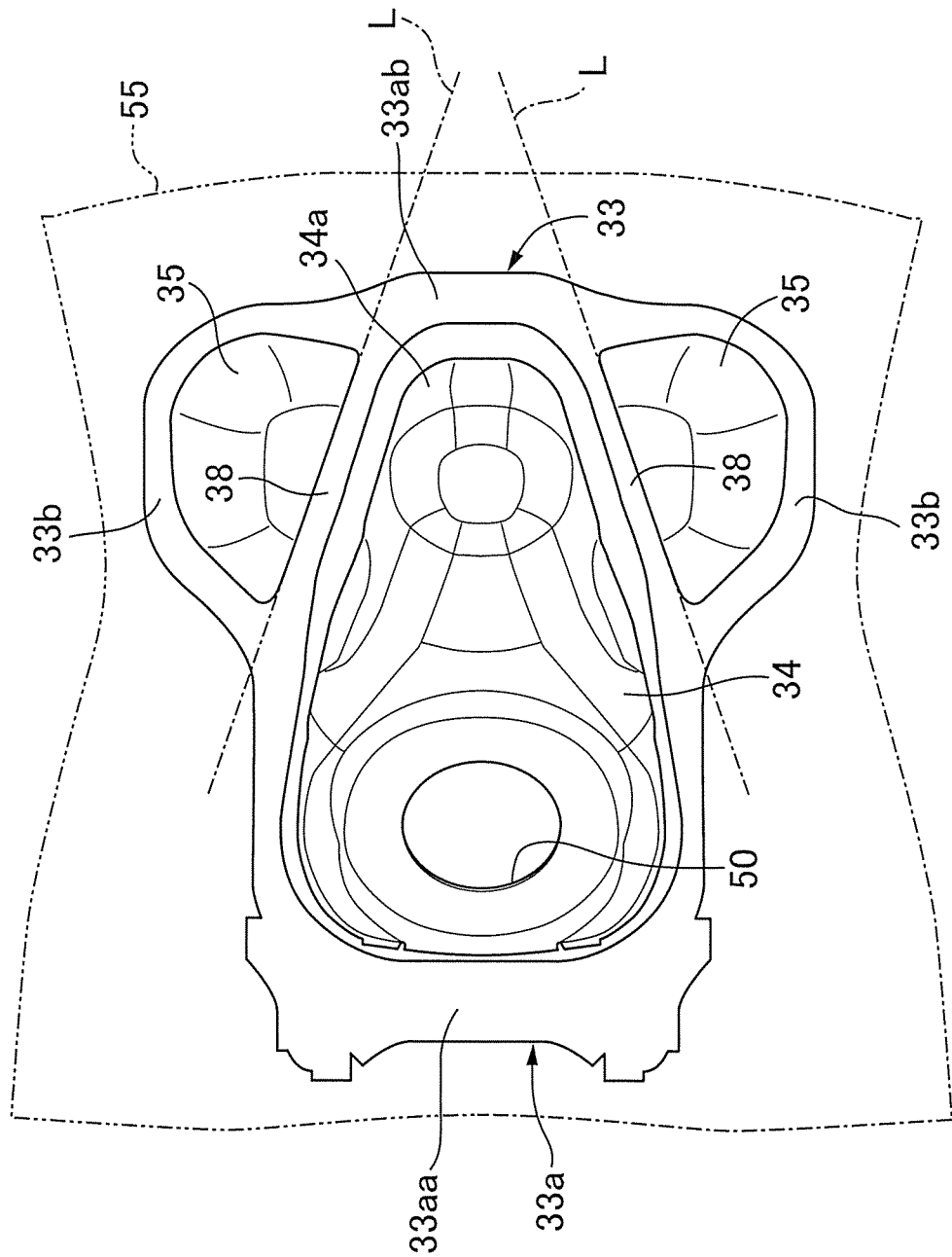
FIG. 10 is a plan view showing a state in which expansion tank portions and lower expansion flange portions are formed by drawing in the press-forming process of the lower tank half body.
Figure 11:
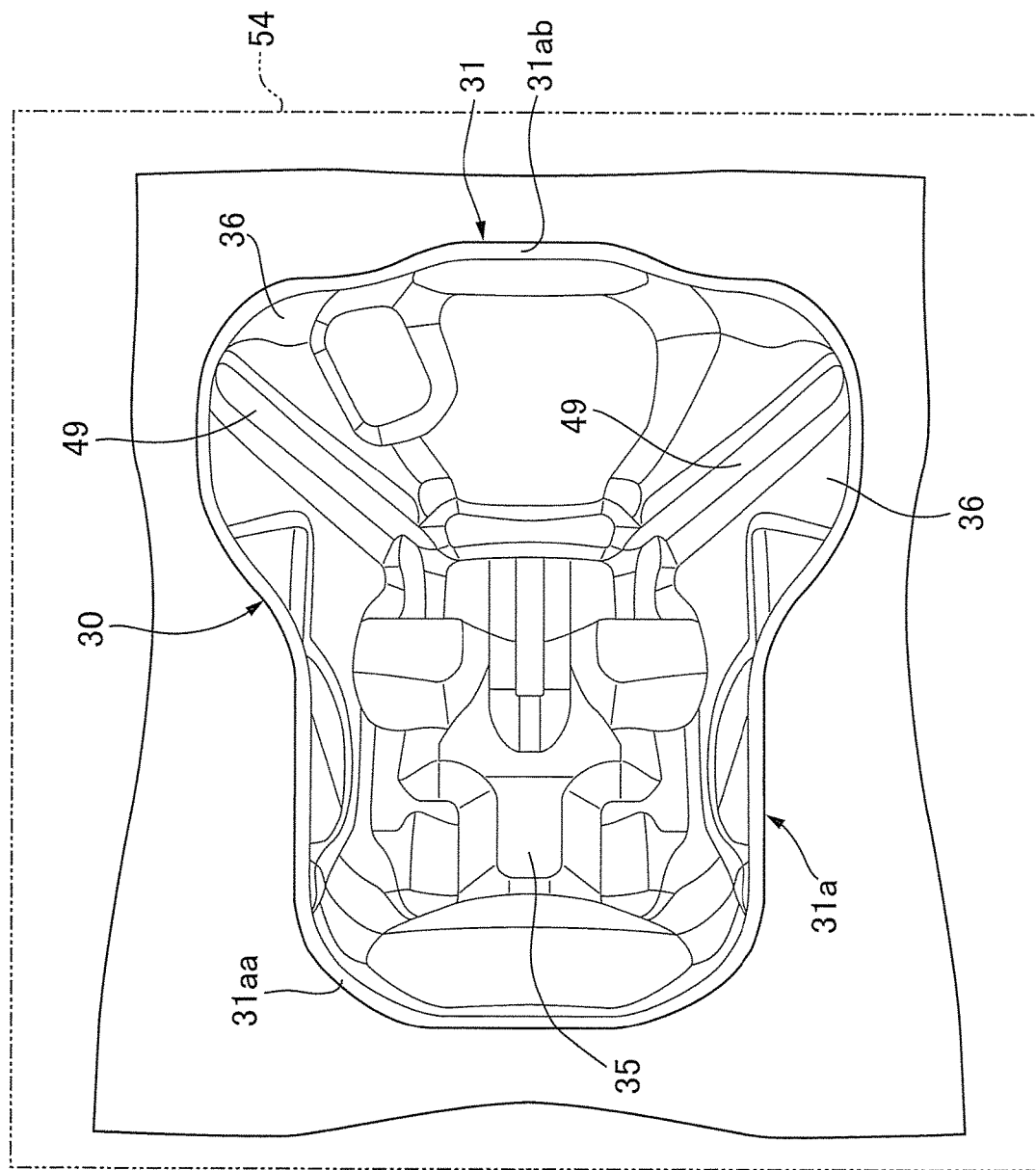
FIG. 11 is a plan view showing a state in which drawing forming of an upper tank half body is completed.

Next, the forming of the lower tank half body 32 will be described with reference to FIGS. 8A to 8C and FIGS. 9 to 11. FIGS. 9 to 11 show a forming process of the lower tank half body 32 in a state of turning a mounting posture of the fuel tank 25 on the two-wheeled motor vehicle upside down.

Figure 8C:
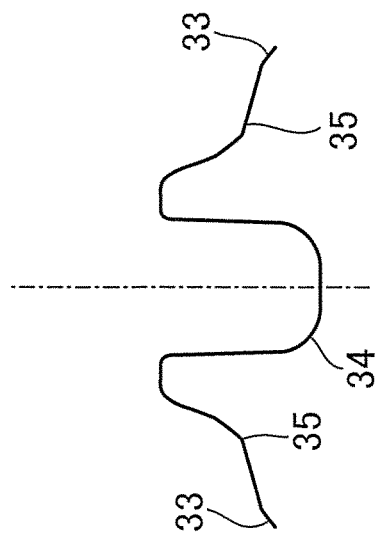
FIGS. 8A to 8C are schematic sectional views sequentially showing a press-forming process of a lower tank half body.
Figure 8B:
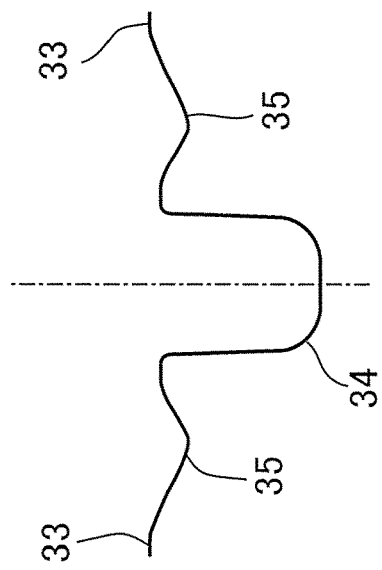
Figure 8A:
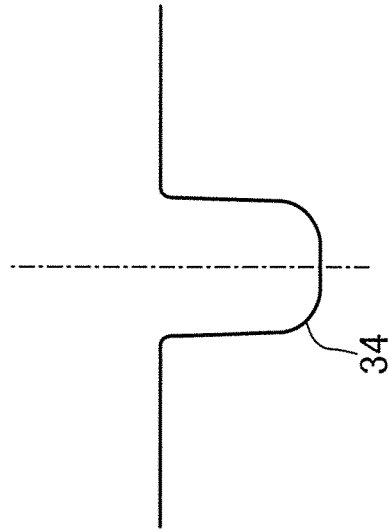

The lower tank half body 32 is press-formed through a forming process in which first, second, and third steps shown in FIGS. 8A to 8C are successively performed. In the first step shown in FIG. 8A, as shown in FIG. 9, the lower tank main body portion 34 is formed by draw-forming a rectangular lower tank plate material 55 indicated by a chain line, and an unnecessary portion is cut off. In the second step subsequent to the first step, as shown in FIG. 8B and FIG. 10, the expansion tank portions 35 and the lower joint flange 33 are formed by draw-forming the lower tank plate material 55 contracted by the draw-forming in the first step. In addition, in the draw-forming in the first and second steps described above, press-forming is performed while pressing a portion corresponding to the lower planar flange portion 33a.

In a third step subsequent to the second step, as shown in FIG. 8C, the lower expansion flange portions 33h and the expansion tank portions 35 are folded downward with connection portions of the lower planar flange portion 33a and the lower expansion flange portions 33b as base points. Portions outside straight lines L shown in FIG. 10 are bent downward as the lower expansion flange portions 33h and the expansion tank portions 35.

On the other hand, the upper tank half body 30 is also press-formed, and in the press-forming, as shown in FIG. 11 draw-forming is performed from a rectangular upper tank plate material 54 indicated by a chain line to form the upper tank main body portion 36 and the protrusion portions 37, and the upper joint flange 31.

Incidentally, in the draw-forming described above, the upper tank plate material 54 and the lower tank plate material 55 are sandwiched between upper and lower molding dies not shown and drawn toward a protrusion shape while receiving a frictional resistance force. However, when the upper tank plate material 54 and the lower tank plate material 55 are made of pure titanium, characteristics that the upper tank plate material 54 and the lower tank plate material 55 extend in an extending direction (a left-right direction with respect to a paper surface of FIGS. 9 to 11) of the plate materials, but the amount of extension in a direction orthogonal to the extending direction is small can be obtained. A draw process can be carried out by sufficiently leveraging the characteristics.

Figure 12:
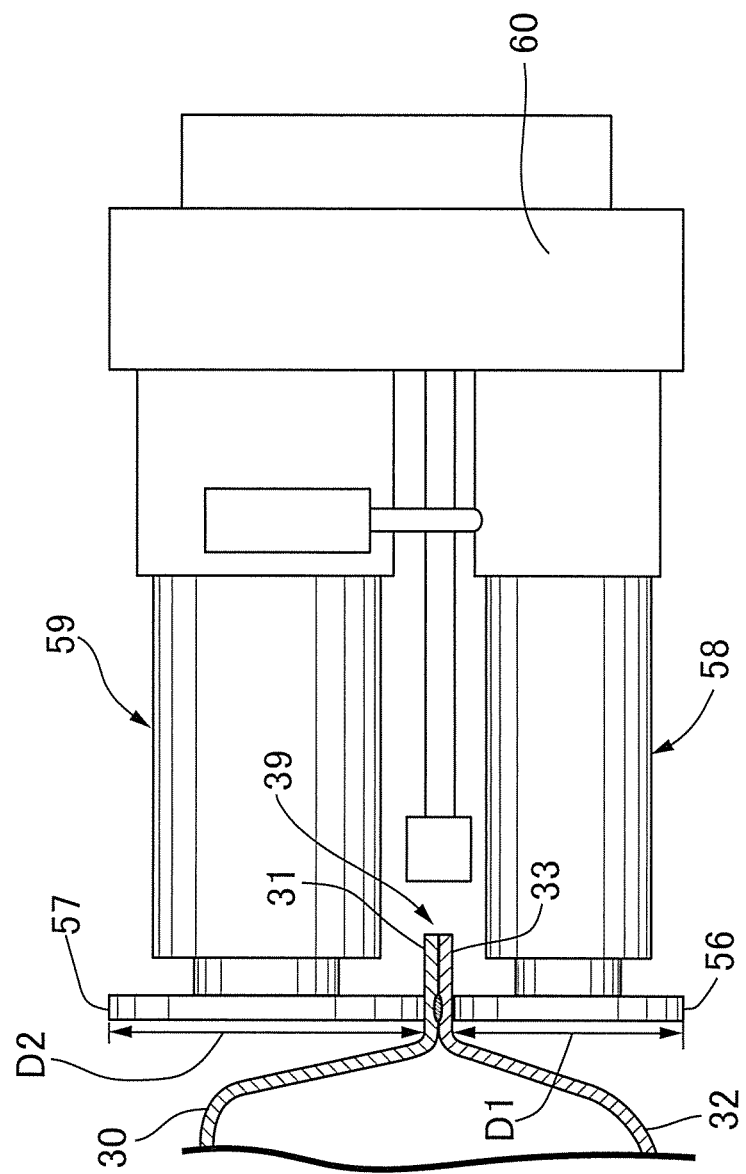
FIG. 12 is a partially longitudinal side view showing a part of the fuel tank and a seam-welding device.

Referring to FIG. 12, the upper joint flange 31 and the lower joint flange 33 are seam-welded by a first roller electrode 56 and a second roller electrode 57 so as to sandwich the lower joint flange 33 and the upper joint flange 31 between the second roller electrode 57 and the first roller electrode 56. The first roller electrode 56 is abutted against the lower joint flange 33 and the second roller electrode 57 is abutted against the upper joint flange 31. The second roller electrode 57 is formed with a diameter larger than that of the first roller electrode 56. In other words, a diameter D2 of the second roller electrode 57 is set to be larger than a diameter D1 of the first roller electrode 56.

First and second electrode mechanisms 58 and 59 having the first and second roller electrodes 56 and 57, respectively, are supported so as to be displaceable in the up-down direction by a column 60 that is placed at a fixed position, and the seam-welding is performed by energizing the first and second roller electrodes 56 and 57 rolling while coming into contact with the lower joint flange 33 and the upper joint flange 31.

At a position corresponding the connection portion of the main body corresponding joint portion 39a and the expansion tank corresponding joint portions 39b of the joint portion 39, on a side wall of at least one of the upper tank half body 30 and the lower tank half body 32 in the present embodiment, on a side wall of the upper tank half body 30 at a portion corresponding to a connection portion of the first lower and upper planar portions 33a a and 31aa of the lower planar flange portion 33a and the upper planar flange portion 31a and the lower expansion flange portions 33b and the upper expansion flange portions 31b, roller escape recesses 61 and 62 are recessed inward, for example, at two positions. The escape recesses 61 and 62 are provided for avoiding a contact with at least one of the first and second roller electrodes 56, 57, in the present embodiment, the second roller electrode 57.

In addition, an angle α, as seen in a side view, of the connection portion of the expansion tank corresponding joint portions 39b to the main body corresponding joint portion 39a at the portion corresponding to the roller escape recesses 61 and 62 is set to 20 degrees or more.

Next, the operation of the present embodiment will be described. In the fuel tank 25 including the upper tank half body 30 that is made of metal and press-formed with the upper joint flange 31 on the outer periphery of the upper tank half body 30 and the lower tank half body 32 that is made of metal and press-formed with the lower joint flange 33 on the outer periphery of the lower tank half body 32, the lower joint flange 33 being joined to the upper joint flange 31, parts of the lower joint flange 33 and the upper joint flange 31 are formed in the flat shape as the lower planar flange portion 33a and the upper planar flange portion 31a, respectively. The lower tank half body 32 is formed with the lower tank main body portion 34 and the pair of expansion tank portions 35. The lower tank main body portion 34 is elongated in a direction parallel to the reference plane BP including the joint surfaces of the lower planar flange portion 33a and the upper planar flange portion 31a. The lower tank main body portion 34 includes the narrow portion 34a that is narrower on one side of the lower tank main body portion 34 than the other side along the longitudinal direction of the lower tank main body portion 34. The lower tank main body portion 34 bulges downward from the reference plane BR The pair of expansion tank portions 35 are disposed on opposite sides of the narrow portion 34a as seen in a plan view from a direction orthogonal to the reference plane BP. The pair of expansion tank portions 35 are formed to be shallower than the lower tank main body portion 34, and bulges downward from the reference plane BR As a result, the capacity of the fuel tank 25 can be increased while reducing the cost with the effective use of the lower tank plate material 55 for press-forming the lower tank half body 32. Furthermore, since the expansion tank portions 35 are shallower than the lower tank main body portion 34, the formability of the lower tank main body portion 34 at the time of press-forming can be improved while reducing a dead remaining amount in the expansion tank portions 35.

Further, since the lower tank half body 32 is formed with the lower tank main body portion 34 and the pair of expansion tank portions 35 disposed on opposite sides of the lower tank main body portion 34, the shape of the fuel tank 25 is complicated, and the fuel tank 25 is prevented from increasing in size while the capacity is increased, thereby being capable of reducing the cost with the effective use of the tank plate materials 54 and 55 for press-forming.

In addition, since the lower tank half body 32 is formed with the flat plate portion 38 flush with the lower planar flange portion 33a and interposed between the narrow portion 34a of the lower tank main body portion 34 and the expansion tank portions 35, the lower tank main body portion 34 and the expansion tank portions 35 can be separated from each other while reducing the weight.

Furthermore, the lower tank main body deepest portion 34b of the lower end portion of the lower tank main body portion 34 and the expansion tank deepest portions 35a of the lower end portions of the expansion tank portions 35 are disposed at positions offset from each other in the longitudinal direction, the lower tank main body deepest portion 34b is largest in distance from the reference plane BP, and the expansion tank deepest portions 35a is largest in distance from the reference plate BP. As a result, the lower tank main body portion 34 and the expansion tank portions 35 can be formed with the more effective use of the lower tank plate material 55, thereby being capable of reducing the cost and improving the formability of the deepest portion 34b of the lower tank main body portion.

In addition, the upper tank half body 30 is formed with the upper tank main body portion 36 and the pair of protrusion portions 37, the upper tank main body portion 36 bulges above the reference plane BP, and the pair of protrusion portions 37 protrude laterally from the upper tank main body portion 36 to cover the respective expansion tank portions 35 and are disposed underneath the reference plane BP. The upper tank main body highest portion 36a of the upper end portion of the upper tank main body portion 36 and the protrusion lowest portions 37a of the lower end portions of the protrusion portions 37 are disposed at positions offset from each other in the longitudinal direction, the upper tank main body highest portion 36a is largest in distance from the reference plane BP, and the protrusion lowest portions 37a are largest in distance from the reference plane BP. As a result, the upper tank main body portion 36 and the protrusion portions 37 can be formed with the more effective use of the upper tank plate material 54 for press-forming the upper tank half body 30, thereby being capable of reducing the cost and improving the formability of the upper tank main body portion 36.

In addition, the lower planar flange portion 33a and the upper planar flange portion 31a include the first lower and upper planar portions 33aa and 31aa and the second lower and upper planar portions 33a b and 3 lab, respectively, the first lower and upper planar portions 33aa and 31aa are disposed on the other side along the longitudinal direction and disposed at peripheries of the lower tank half body 32 and the upper tank half body 30, respectively, and the second lower and upper planar portions 33a b and 31a b are disposed on the end part on the one side along the longitudinal direction at peripheries of the lower tank half body 32 and the upper tank half body 30, respectively. The lower joint flange 33 and the upper joint flange 31 include the lower and upper expansion flange portions 33b and 31b that are remaining portions except for the lower planar flange portion 33a and the upper planar flange portion 31a, the lower and upper expansion flange portions 33b and 31b are formed to connect the first lower and upper planar portions 33aa and 31aa and the second lower and upper planar portions 33ab and 31ab and to be inclined downward toward outside from the lower planar flange portion 33a and the upper planar flange portion 31a. As a result, the rigidity of the lower tank main body portion 34 along the longitudinal direction is secured while with a reduction in the area of the lower tank plate material 55 required for forming the expansion tank portions 35, the excellent formability can be obtained while reducing the cost.

Incidentally, the upper joint flange 31 of the upper tank half body 30 and the lower joint flange 33 of the lower tank half body 32 are seam-welded by the first and second roller electrodes 56 and 57 sandwiching the upper joint flange 31 and the lower joint flange 33. The joint portion 39 is formed by seam-welding the upper joint flange 31 and the lower joint flange 33. The joint portion 39 includes the main body corresponding joint portion 39a and the pair of expansion tank corresponding joint portions 39b. The main body corresponding joint portion 39a is disposed in a portion of the outer periphery of the lower tank main body portion 34 except for an area between the joint portion 39 and the expansion tank portions 35. The pair of expansion tank corresponding joint portions 39b are disposed in a portion of the outer periphery of the pair of expansion tank portions 35 excluding an area between the joint portion 39 and the lower tank main body portion 34 and connected to the main body corresponding joint portion 39a. On a side wall of at least one (the upper tank half body 30 in the present embodiment) of the upper tank half body 30 and the lower tank half body 32 at a position corresponding to the connection portion between the main body corresponding joint portion 39a and the expansion tank corresponding joint portions 39, the roller escape recesses 61 and 62 are recessed inwardly. The roller escape recesses 61 and 62 are provided for avoiding a contact with at least one of the first and second roller electrodes 56 and 57 (the second roller electrode 57 in the present embodiment). At least one roller electrode (the second roller electrode 57 in the present embodiment) is prevented from interference with at least one (the upper tank half body 30 in the present embodiment) of the upper tank half body 30 and the lower tank half body 32 at a portion where a traveling direction of the first and second roller electrodes 56 and 57 changes, thereby being capable of improving the formability.

Further, the expansion tank corresponding joint portions 39b are formed so as to bulge laterally while curving downward from the main body corresponding joint portion 39a. The roller escape recesses 61 and 62 are formed on the side wall of the upper tank half body 30. The roller escape recesses 61 and 62 prevent interference with the second roller electrode 57 abutting against the upper joint flange 31 in the first and second roller electrodes 56 and 57. The second roller electrode 57 is larger in diameter than the first roller electrode 56 abutting against the lower joint flange 33. As a result, the roller escape recesses 61 and 62 provided in the side wall of the upper tank half body 30 are reduced in size as much as possible so that the second roller electrode 57 having the larger diameter does not contact the side wall of the upper tank half body 30 as much as possible, and an influence of the roller escape recesses 61 and 62 on the capacity of the fuel tank 25 can be reduced.

Moreover, an angle α, as seen in a side view, of the connection portion of the expansion tank corresponding joint portions 39b to the main body corresponding joint portion 39a in the portion corresponding to the roller escape recesses 61 and 62 is set to 20 degrees or more. This makes it easier for the second roller electrode 57 to avoid contact with the side wall of the upper tank half body 30, thereby being capable of downsizing the roller escape recesses 61 and 62, and more easily securing the tank capacity.

In press-forming the lower tank half body 32 of the fuel tank 25 from the lower tank plate material 55, the first step of draw-forming the lower tank main body portion 34 and the second step of draw-forming the expansion tank portions 35 and the lower joint flange 33 are performed in the stated order. As a result, the formability of the lower tank half body 32 can be improved.

Moreover, in the first and second steps, since the press-forming is performed while pressing the portion corresponding to the lower planar flange portion 33a, the press-forming can be performed by effectively leveraging the lower planar flange portion 33a.

In the third step subsequent to the second step, since the lower expansion flange portions 33b and the expansion tank portions 35 are folded downward with the connection portion of the lower planar flange portion 33a and the lower expansion flange portions 33b as the base point. As a result, the protrusion of the expansion tank portions 35 toward the side is prevented so that the continuity of the lower planar flange portion 33a and the lower expansion flange portions 33b is not impaired, and the width of the fuel tank 25 is reduced so that the capacity of the fuel tank 25 can be increased.

Incidentally, the fuel tank 25 is supported by the vehicle body frame F above the engine E such that the lower tank main body portion 34 is disposed between the pair of main frames 17 of the vehicle body frame F in the two-wheeled motor vehicle, and the expansion tank portions 35 are disposed outside the main frames 17. As a result, the capacity of the fuel tank 25 can be increased by effectively leveraging the space outside the main frames 17, and the fuel tank 25 can be mounted on the vehicle body frame F with the effective use of the space by effectively using the gaps between the lower tank main body portion 34 and the expansion tank portions 35. In addition, since the expansion tank corresponding joint portions 39b are formed so as to protrude laterally while curving downward from the main body corresponding joint portion 39a, a compact arrangement in the vehicle width direction can be performed.

Further, since the riding seat 26 is disposed behind the expansion tank portions 35 in the vehicle longitudinal direction, an occupant riding on the riding seat 26 can grip, with knees, a narrower portion of the fuel tank 25 at the rear of the expansion tank portions 35, thereby being capable of obtaining an excellent riding posture.

Although an embodiment of the present invention have been described above, the present invention is not limited to the embodiment described above, and various design changes can be made without departing from the gist of the present invention.

For example, although the two-wheeled motor vehicle has been described in the embodiment described above, the present invention is widely applicable to saddle riding vehicles including a three-wheeled motor vehicle.

What is claimed is:

1. A fuel tank comprising:
an upper tank half body that is made of metal and press formed so as to have an upper joint flange on an outer periphery of the upper tank half body; and
a lower tank half body that is made of metal and press formed so as to have a lower joint flange on an outer periphery of the lower tank half body, the upper joint flange and the lower joint flange being sandwiched between and seam welded by a pair of roller electrodes,
wherein the lower tank half body includes a lower tank main body portion and a pair of expansion tank portions that are shallower than the lower tank main body portion and disposed on opposite sides of the lower tank main body portion,
the upper joint flange and the lower joint flange are seam welded together to form a joint portion that includes a main body corresponding joint portion and a pair of expansion tank corresponding joint portions, the main body corresponding joint portion being disposed on an outer periphery of the lower tank main body portion except for an area between the joint portion and the expansion tank portion, the pair of expansion tank corresponding joint portions being connected to the main body corresponding joint portion and disposed on an outer periphery of the pair of expansion tank portions except for an area between the joint portion and the lower tank main body portion, and
a side wall of at least one of the upper tank half body and the lower tank half body is provided with a roller escape recess that is recessed inwardly, the roller escape recess being formed at a position corresponding to a connection portion of the main body corresponding joint portion and the expansion tank corresponding joint portions, and avoiding a contact with at least one roller electrode out of the pair of roller electrodes.

2. The fuel tank according to claim 1,
wherein the expansion tank corresponding joint portions are formed to bulge laterally while curving downward from the main body corresponding joint portion, and
the roller escape recess is formed on the side wall of the upper tank half body, the roller escape recess avoiding interference with a second roller electrode, of the pair of roller electrodes, that abuts against the upper joint flange and is larger in diameter than a first roller electrode, of the pair of roller electrodes, abutting against the lower joint flange.

3. The fuel tank according to claim 2,
wherein an angle, as seen in a side view, of the connection portion of the expansion tank corresponding joint portions to the main body corresponding joint portion in a portion corresponding to the roller escape recess is set to 20 degrees or more.

4. A saddle riding vehicle on which the fuel tank according to claim 1 is mounted, comprising:
the fuel tank having the pair of expansion tank portions disposed on opposite sides of a front portion of the lower tank main body portion in a vehicle longitudinal direction;
a vehicle body frame on which the fuel tank is mounted; and
a riding seat disposed behind the expansion tank portions in the vehicle longitudinal direction.

5. The saddle riding vehicle according to claim 4,
wherein the vehicle body frame includes a pair of left and right main frames that are separated to left and right from a head pipe steerably supporting a steering handlebar and extend rearward, and
the fuel tank is supported by the vehicle body flame so as to dispose the expansion tank portions outside the main frames.

6. A saddle riding vehicle on which the fuel tank according to claim 2 is mounted, comprising:
the fuel tank having the pair of expansion tank portions disposed on opposite sides of a front portion of the lower tank main body portion in a vehicle longitudinal direction;
a vehicle body frame on which the fuel tank is mounted; and
a riding seat disposed behind the expansion tank portions in the vehicle longitudinal direction.

7. A saddle riding vehicle on which the fuel tank according to claim 3 is mounted, comprising:
the fuel tank having the pair of expansion tank portions disposed on opposite sides of a front portion of the lower tank main body portion in a vehicle longitudinal direction;
a vehicle body frame on which the fuel tank is mounted; and
a riding seat disposed behind the expansion tank portions in the vehicle longitudinal direction.

\* \* \* \* \*